(12) United States Patent
D'Aquisto et al.

(10) Patent No.: US 8,364,562 B2
(45) Date of Patent: *Jan. 29, 2013

(54) SYSTEM, COMPUTER PROGRAM AND METHOD FOR PROCESSING PRESENTMENT AND ADJUSTMENT INFORMATION TO INSTITUTIONS PARTICIPATING IN A REGIONAL OR NATIONAL CLEARING HOUSE

(75) Inventors: Tom D'Aquisto, Carrollton, TX (US); Bill Cummings, Dallas, TX (US)

(73) Assignee: Viewpointe Clearing, Settlement & Association Services, LLC, Charlotte, NC (US)

( * ) Notice: Subject to any disclaimer, the term of this patent is extended or adjusted under 35 U.S.C. 154(b) by 941 days.
This patent is subject to a terminal disclaimer.

(21) Appl. No.: 12/140,026

(22) Filed: Jun. 16, 2008

(65) Prior Publication Data

US 2008/0319880 A1 Dec. 25, 2008

Related U.S. Application Data

(63) Continuation-in-part of application No. 10/650,777, filed on Aug. 29, 2003, now Pat. No. 7,725,389.

(60) Provisional application No. 60/406,641, filed on Aug. 29, 2002.

(51) Int. Cl.
G07B 17/00 (2006.01)
G06F 15/20 (2006.01)

(52) U.S. Cl. .......................................... 705/30; 364/408

(58) Field of Classification Search ...................... 705/30
See application file for complete search history.

(56) References Cited

U.S. PATENT DOCUMENTS

| | | | |
|---|---|---|---|
| 5,265,007 A * | 11/1993 | Barnhard et al. ............... | 705/45 |
| 5,484,988 A | 1/1996 | Hills et al. | |
| 5,583,759 A | 12/1996 | Geer | |
| 5,717,868 A | 2/1998 | James | |
| 5,774,663 A | 6/1998 | Randle et al. | |
| 5,787,403 A | 7/1998 | Randle | |

(Continued)

OTHER PUBLICATIONS

"Plethora of Anti-Check Fraud Products Hit Market" by Phillips Business Information, Inc. Processing Report, v 5, n 16, p. N/A, Aug. 18, 1994.*

(Continued)

*Primary Examiner* — Garcia Ade
(74) *Attorney, Agent, or Firm* — Gardere Wynne Sewell LLP

(57) ABSTRACT

A system, computer program and method for adjusting debits and credits received from participating institutions are provided. The system includes a plurality of remote computers of participating institutions, a central server, a network interface in communication with the clearing house computer and the plurality of remote computers over a network, and a database in communication with the central server. The network interface is configured to receive a plurality of presentment data from a first computer of the plurality of remote computers of participating institutions. Each of the plurality of presentment data including one or more debit or credit items each having a presentment amount. The central server is configured to store in the database the plurality of presentment data, receive, from a second computer of the remote computers of participating institutions, an adjustment request corresponding to one or more debit or credit items received from the first computer of the plurality of remote computers of participating institutions, communicate the adjustment request to the first computer of the plurality of remote computers of participating institutions via the network interface, enable the first computer of the plurality of remote computers of participating institutions to accept or deny the adjustment request, and initiate an adjustment based on the adjustment amount if the first computer of the plurality of remote computers of participating institutions accepts the adjustment request. The adjustment request includes detailed adjustment data having an adjustment amount and one or more scanned images corresponding to the respective debit or credit items.

11 Claims, 14 Drawing Sheets

U.S. PATENT DOCUMENTS

| | | | |
|---|---|---|---|
| 5,848,400 A | 12/1998 | Chang | |
| 5,899,982 A | 5/1999 | Randle | |
| 5,930,778 A | 7/1999 | Geer | |
| 5,974,146 A | 10/1999 | Randle et al. | |
| 5,978,780 A * | 11/1999 | Watson | 705/40 |
| 6,032,137 A | 2/2000 | Ballard | |
| 6,098,053 A | 8/2000 | Slater | |
| 6,164,528 A | 12/2000 | Hills et al. | |
| 6,233,340 B1 | 5/2001 | Sandru | |
| 6,283,366 B1 | 9/2001 | Hills et al. | |
| 6,354,491 B2 | 3/2002 | Nichols et al. | |
| 6,513,019 B2 | 1/2003 | Lewis | |
| 6,547,129 B2 | 4/2003 | Nichols et al. | |
| 6,549,624 B1 | 4/2003 | Sandru | |
| 6,792,110 B2 | 9/2004 | Sandru | |
| 6,873,979 B2 * | 3/2005 | Fishman et al. | 706/21 |
| 7,251,624 B1 * | 7/2007 | Lee et al. | 705/35 |
| RE40,220 E | 4/2008 | Nichols et al. | |
| 2002/0026396 A1 * | 2/2002 | Dent et al. | 705/35 |
| 2002/0065752 A1 | 5/2002 | Lewis | |
| 2002/0128964 A1 | 9/2002 | Baker et al. | |
| 2004/0230510 A1 | 11/2004 | Tyson-Quah | |

OTHER PUBLICATIONS

Israel, Mike, et al., Plethora of Anti-Check Fraud Products Hit Market, Item Processing Report, v 5, n 16, p. N/A, Aug. 18, 1994, ISSN: 1048-5120, p. 1-3.

Lambert, Diane, et al., Updating Timing Profiles for Millions of Customers in Real-Time, Statistics and Data Mining Research Department, Bell Labs, Lucent Technologies, 600 Mountain Ave., Murray Hill, NJ 07974, (2000), p. 1-13.

* cited by examiner

FIG. 2A

NCHA Real-Time Settlement Host

Settlement Central - NCHA 11:00 aCT

Select an Exchange: [NCHA 11:00 aCT ▼] on date [11/26/2007 ▼] [Select]  Refresh Grid Exchange Name: NCHA 11:00 aCT
FRB Initiated: Yes, Current  [Initiate FRB]

Status: Open — Presentment Closed — Confirmation Closed — Settle  ☐ Show Details  [Change Status]

| RT | Participant Name | Pres To | Pres Items | Presented Amount | Confirm | Non-Con | No Actio | Rcvd Item | Received Amount | Risk |
|---|---|---|---|---|---|---|---|---|---|---|
| 1113-2258-3 | American State Bank | 5 | 2 | 210.90 | 4 | 0 | 0 | 18,538 | 12,160,780.18 | ⚠ |
| 0640-0001-7 | Amsouth Bank Nashville | 0 | 0 | 0.00 | 9 | 0 | 0 | 3,670 | 5,307,916.36 | |
| 0620-0001-9 | Amsouth Bank of Alabama | 108 | 142,390 | 150,928,687.94 | 88 | 0 | 0 | 67,591 | 88,056,815.65 | |
| 0710-0003-9 | Bank of America - Chicago | 15 | 46,187 | 359,957,288.63 | 4 | 0 | 0 | 6,036 | 9,451,578.44 | |
| 1221-0170-6 | Bank of America Arizona | 7 | 5,662 | 12,145,928.42 | 5 | 0 | 0 | 3,223 | 1,033,146.86 | ⚠ |
| 0119-0057-1 | Bank of America Connecticut | 38 | 98,461 | 232,096,704.72 | 36 | 0 | 0 | 138,011 | 320,435,372.07 | |
| 0610-0005-2 | Bank of America Georgia | 45 | 91,204 | 178,839,506.32 | 36 | 0 | 0 | 54,967 | 42,264,848.34 | |
| 0630-0004-7 | Bank of America Jacksonville | 2 | 2 | 1,232.32 | 43 | 0 | 0 | 29,077 | 29,459,797.97 | ⚠ |
| 1010-0003-5 | Bank of America Kansas City | 13 | 10,679 | 13,766,571.70 | 17 | 0 | 0 | 10,801 | 12,631,444.02 | |
| 1220-0066-1 | Bank of America Los Angeles | 14 | 36,339 | 11,781,769.54 | 24 | 0 | 0 | 21,763 | 24,216,497.99 | |
| 0110-0013-8 | Bank of America Massachusetts | 36 | 88,202 | 111,387,757.49 | 62 | 0 | 0 | 83,080 | 237,431,415.43 | ⚠ |
| 0810-0003-2 | Bank of America MO | 19 | 13,491 | 24,413,205.10 | 39 | 0 | 0 | 48,513 | 61,483,309.15 | |
| 1070-0032-7 | Bank of America New Mexico | 1 | 610 | 173,357.15 | 2 | 0 | 0 | 84 | 188,633.44 | |
| 0530-0019-6 | Bank of America North Carolina | 17 | 21,484 | 44,599,095.59 | 31 | 0 | 0 | 47,643 | 60,304,382.47 | ⚠ |
| 1030-0001-7 | Bank of America Oklahoma | 0 | 0 | 0.00 | 13 | 0 | 0 | 32,665 | 39,475,299.47 | |
| 1210-0035-8 | Bank of America San Francisco | 5 | 6,885 | 4,346,702.78 | 3 | 0 | 0 | 5,763 | 929,046.32 | |
| 0631-0027-7 | Bank of America Tampa | 20 | 20 | (80,653.28) | 34 | 0 | 0 | 11,931 | 1,976,438.31 | ⚠ |
| 1250-0002-4 | Bank of America Washington | 1 | 7,670 | 4,497,381.15 | 3 | 0 | 0 | 4,003 | 2,996,072.77 | ⚠ |
| 1110-0002-5 | Bank of America, Dallas | 53 | 56,447 | 128,736,140.36 | 24 | 0 | 0 | 4,487 | 3,374,551.36 | |
| 1110-1282-2 | Bank of America, DT - Image | 259 | 284,438 | 645,791,631.76 | 229 | 0 | 0 | 175,849 | 230,842,474.63 | ⚠ |
| 1130-0002-3 | Bank of America, Houston | 7 | 16,961 | 30,315,039.46 | 1 | 0 | 0 | 437 | 1,354,682.40 | ⚠ |
| 0560-0738-7 | Bank of America, Maryland | 25 | 65,065 | 53,427,221.34 | 29 | 0 | 0 | 21,442 | 25,087,884.44 | |
| 1140-0001-9 | Bank of America, San Antonio | 5 | 2,440 | 6,837,205.76 | 2 | 0 | 0 | 678 | 625,243.84 | |
| 0759-0324-2 | Bank of Brodhead | 0 | 0 | 0.00 | 1 | 0 | 0 | 279 | 103,621.61 | ⚠ |
| 0759-0315-8 | Bank of Mauston | 0 | 0 | 0.00 | 1 | 0 | 0 | 1,138 | 391,178.41 | ⚠ |

NCHA Real-Time Settlement Host

Main | Maintenance

Daily Transmissions

Transmission Received On: Tuesday, November 27, 2007

Table 502

| Transmission ID | When Accepted | When Completed | Participant RT | Participant Name | Status | Transmitted By | # of Transactions |
|---|---|---|---|---|---|---|---|
| 8934 | 11/27/2007 12:56 AM | 11/27/2007 1:00 AM | 8888-8882-2 | Brasfield Technologies | Processed | ielic.image | 82 |
| 8935 | 11/27/2007 7:39 AM | 11/27/2007 7:41 AM | 0750-0005-1 | Marshall & Ilsley Bank | Processed | image.settlement | 893 |
| 8936 | 11/27/2007 8:09 AM | 11/27/2007 8:10 AM | 9999-9999-5 | Endpoint-Image Provider | Processed | Endpoint Settlement | 103 |
| 8937 | 11/27/2007 8:10 AM | 11/27/2007 8:10 AM | 9999-9999-5 | Endpoint-Image Provider | Processed | Endpoint Settlement | 92 |
| 8938 | 11/27/2007 8:14 AM | 11/27/2007 8:20 AM | 9999-9999-5 | Endpoint-Image Provider | Processed | Endpoint Settlement | 4 |
| 8939 | 11/27/2007 8:14 AM | 11/27/2007 8:20 AM | 9999-9999-5 | Endpoint-Image Provider | Processed | Endpoint Settlement | 105 |
| 8940 | 11/27/2007 8:21 AM | 11/27/2007 8:30 AM | 9999-9999-5 | Endpoint-Image Provider | Processed | Endpoint Settlement | 8 |
| 8941 | 11/27/2007 10:24 AM | 11/27/2007 10:30 AM | 8888-8882-2 | Brasfield Technologies | Processed | ielic.image | 1 |

[Select]

Transmission Details 504

| Exchange ID | Exchange Date | Receiver RT | C/L | Amount DB | Amount CR | Item Count | Hold Indicator | Comments | Error | Error Description |
|---|---|---|---|---|---|---|---|---|---|---|
| 127 | 11/27/2007 | 0622-0453-0 | IMG | $220,774.28 | -- | 130 | N | from 062001186 to 062204530 via Ima | -- | -- |
| 127 | 11/27/2007 | 2620-9012-0 | IMG | $93.36 | -- | 3 | N | from 062001186 to 065191721 via Ima | -- | -- |
| 127 | 11/27/2007 | 2620-9012-0 | IMG | $3,039.58 | -- | 27 | N | from 062001186 to 262075475 via Ima | -- | -- |
| 127 | 11/27/2007 | 2620-9012-0 | IMG | $11,755.14 | -- | 61 | N | from 062001186 to 262083959 via Ima | -- | -- |
| 127 | 11/27/2007 | 2620-9012-0 | IMG | $14,005.17 | -- | 107 | N | from 062001186 to 262083991 via Ima | -- | -- |
| 127 | 11/27/2007 | 2620-9012-0 | IMG | $5,623.80 | -- | 11 | N | from 062001186 to 262084893 via Ima | -- | -- |
| 127 | 11/27/2007 | 2620-9012-0 | IMG | $14,378.11 | -- | 71 | N | from 062001186 to 262084916 via Ima | -- | -- |
| 127 | 11/27/2007 | 2620-9012-0 | IMG | $561.44 | -- | 7 | N | from 062001186 to 262084961 via Ima | -- | -- |
| 127 | 11/27/2007 | 2620-9012-0 | IMG | $2,683.83 | -- | 6 | N | from 062001186 to 262085070 via Ima | -- | -- |
| 127 | 11/27/2007 | 2620-9012-0 | IMG | $2,082.29 | -- | 22 | N | from 062001186 to 262085096 via Ima | -- | -- |
| 127 | 11/27/2007 | 2620-9012-0 | IMG | $1,669.83 | -- | 15 | N | from 062001186 to 262085261 via Ima | -- | -- |

Participants | Exchanges | Rollups | Active Directory | Cash Letter Types | Holidays | Image Fees | Img Tier Pricing | Fees | Transmissions | Invoicing | Lookup Tables

[View Presentment Document] [Save] Help

SYSTEM, COMPUTER PROGRAM AND METHOD FOR PROCESSING PRESENTMENT AND ADJUSTMENT INFORMATION TO INSTITUTIONS PARTICIPATING IN A REGIONAL OR NATIONAL CLEARING HOUSE

CROSS REFERENCE TO RELATED APPLICATIONS

The present application is a continuation-in-part of U.S. patent application Ser. No. 10/650,777, entitled "CLEAR HOUSE SETTLEMENT SYSTEM," filed in the U.S. Patent and Trademark Office on Aug. 29, 2009, now U.S. Pat. No. 7,725,389 hereby incorporated by reference, which claims the benefit of the earlier filing date of U.S. provisional patent application Ser. No. 60/406,641, filed in the U.S. Patent and Trademark Office on Aug. 29, 2002, each having common inventors as the present document.

BACKGROUND OF THE INVENTION

1. Field of the Invention

The present invention is generally related to clearing house systems, and more particularly to a system, computer program and method for processing presentment and settlement information to institutions participating in a regional or national clearing house.

2. Discussion of the Background

In a clearing house settlement system checks and other cash items drawn against different institutions are exchanged. The clearing house institutions to the exchange report data regarding the items presented and exchanged with other receiving institutions. This data may include the number of items and amount of items exchanged. A clearing house processes the data and calculates the net credit or debit for institutions participating in an exchange. The clearing house then initiates the debit or credit of an account of the respective member institutions. However, the data often include discrepancies. Since the debit or credit of the accounts relies on the accuracy of the data received from the institutions, which may include discrepancies, there are inefficiencies associated with attempting to reconcile the checks and other cash items drawn against different institutions.

Additionally, adjustments to the debits and credits due to inaccuracies typically require physical copies of the debit or credit items to be delivered to the institution so that the adjustment can be verified. This results in significant delays in reconciling discrepancies in the data received from the institutions.

Thus, there currently exists deficiencies in receiving and processing presentment and settlement information.

SUMMARY OF THE INVENTION

Accordingly, one aspect of the present invention is to provide a clearing house system for adjusting debits and credits received from participating institutions. The system includes a plurality of remote computers of participating institutions, a central server, a network interface in communication with the clearing house computer and the plurality of remote computers over a network, and a database in communication with the central server. The network interface is configured to receive a plurality of presentment data from a first computer of the plurality of remote computers of participating institutions. Each of the plurality of presentment data including one or more debit or credit items each having a presentment amount. The central server is configured to store in the database the plurality of presentment data, receive, from a second computer of the remote computers of participating institutions; an adjustment request corresponding to one or more debit or credit items received from the first computer of the plurality of remote computers of participating institutions, communicate the adjustment request to the first computer of the plurality of remote computers of participating institutions via the network interface, enable the first computer of the plurality of remote computers of participating institutions to accept or deny the adjustment request, and initiate an adjustment based on the adjustment amount if the first computer of the plurality of remote computers of participating institutions accepts the adjustment request. The adjustment request includes detailed adjustment data having an adjustment amount and one or more scanned images corresponding to the respective debit or credit items.

Another aspect of the present invention is to provide a clearing house system for exchanging debits and credits between participating institutions. The system includes a plurality of remote computers of participating institutions, a central server, a network interface in communication with the clearing house computer and the plurality of remote computers over a network, and a database in communication with the central server. The network interface is configured to receive a plurality of presentment data from one or more of the plurality of remote computers. Each of the plurality of presentment data including one or more debit or credit items each having a presentment amount. The central server is configured to store in the database the plurality of presentment data previously received over a predetermined rolling time period, provide means for determining whether a difference between an average presentment amount of the stored presentment data for one or more of the participating institutions from which presentment data is received and the presentment amount of the currently received presentment data is within a predetermined variance, initiate the debits and credits corresponding to the presentment data if the difference is within a predetermined variance, verify the debits and credits corresponding to the presentment data if the difference is more than the predetermined variance, and communicate at least a portion of the stored presentment data via the network interface to one or more of the plurality of remote computers on demand.

Yet another aspect of the present invention is to provide a method for adjusting debits and credits received from participating institutions of a clearing house system that includes a plurality of remote computers of participating institutions, a central server, a network interface in communication with the clearing house computer and the plurality of remote computers over a network, and a database in communication with the central server. The network interface is configured to receive a plurality of presentment data from a first computer of the plurality of remote computers of participating institutions. Each of the plurality of presentment data including one or more debit or credit items each having a presentment amount. The method includes storing in the database the plurality of presentment data, receiving, from a second computer of the remote computers of participating institutions, an adjustment request corresponding to one or more debit or credit items received from the first computer of the plurality of remote computers of participating institutions, communicating the adjustment request to the first computer of the plurality of remote computers of participating institutions via the network interface, enabling the first computer of the plurality of remote computers of participating institutions to accept or deny the adjustment request, and initiating an adjustment based on the adjustment amount if the first computer of the plurality of remote computers of participating institutions accepts the adjustment request. The adjustment request includes detailed adjustment data having an adjustment amount and one or more scanned images corresponding to the respective debit or credit items, Another aspect of the present invention is to provide a computer program product embodied on a computer readable medium for adjusting debits and credits received from participating institutions of a clearing house system that includes a plurality of remote computers of participating institutions, a central server, a network interface in communication with the clearing house computer and the plurality of remote computers over a network, and a database in communication with the central server. The network interface is configured to receive a plurality of presentment data from a first computer of the plurality of remote computers of participating institutions. Each of the plurality of presentment data including one or more debit or credit items each having a presentment amount. The computer program product includes a first computer code for storing in the database the plurality of presentment data, a second computer code for receiving, from a second computer of the remote computers of participating institutions, an adjustment request corresponding to one or more debit or credit items received from the first computer of the plurality of remote computers of participating institutions, a third computer code for communicating the adjustment request to the first computer of the plurality of remote computers of participating institutions via the network interface, a fourth computer code for enabling the first computer of the plurality of remote computers of participating institutions to accept or deny the adjustment request, and a fifth computer code for initiating an adjustment based on the adjustment amount if the first computer of the plurality of remote computers of participating institutions accepts the adjustment request. The adjustment request includes detailed adjustment data having an adjustment amount and one or more scanned images corresponding to the respective debit or credit items.

Yet another aspect of the present invention is to provide a computer program product embodied on a computer readable medium for exchanging debits and credits between participating institutions of a clearing house system that includes a plurality of remote computers of participating institutions, a central server, a network interface in communication with the clearing house computer and the plurality of remote computers over a network, and a database in communication with the central server. The network interface is configured to receive a plurality of presentment data from one or more of the plurality of remote computers, each of the plurality of presentment data including one or more debit or credit items each having a presentment amount. The computer program product includes a first computer code for storing in the database the plurality of presentment data previously received over a predetermined rolling time period, a second computer code for calculating an average presentment amount of the stored presentment data for one or more of the participating institutions from which presentment data is received, a third computer code for determining the difference between the average presentment amount and the presentment amount of the currently received presentment data, a fourth computer code for initiating the debits and credits corresponding to the presentment data if the difference is within a predetermined variance, a fifth computer code for verifying the debits and credits corresponding to the presentment data if the difference is more than the predetermined variance, and a sixth computer code for communicating at least a portion of the stored presentment data via the network interface to one or more of the plurality of remote computers on demand.

BRIEF DESCRIPTION OF THE DRAWINGS

A more complete appreciation of the present invention and many of the attendant advantages thereof will be readily obtained as the same becomes better understood by reference to the following detailed description when considered in conjunction with the accompanying drawings, wherein:

FIGS. 2A-2J illustrate an exemplary user interface and computer program for processing presentment and settlement information to institutions participating in a regional or national clearing house in accordance with an embodiment of the present invention.

DETAILED DESCRIPTION THE PREFERRED EMBODIMENTS

Figure 1:
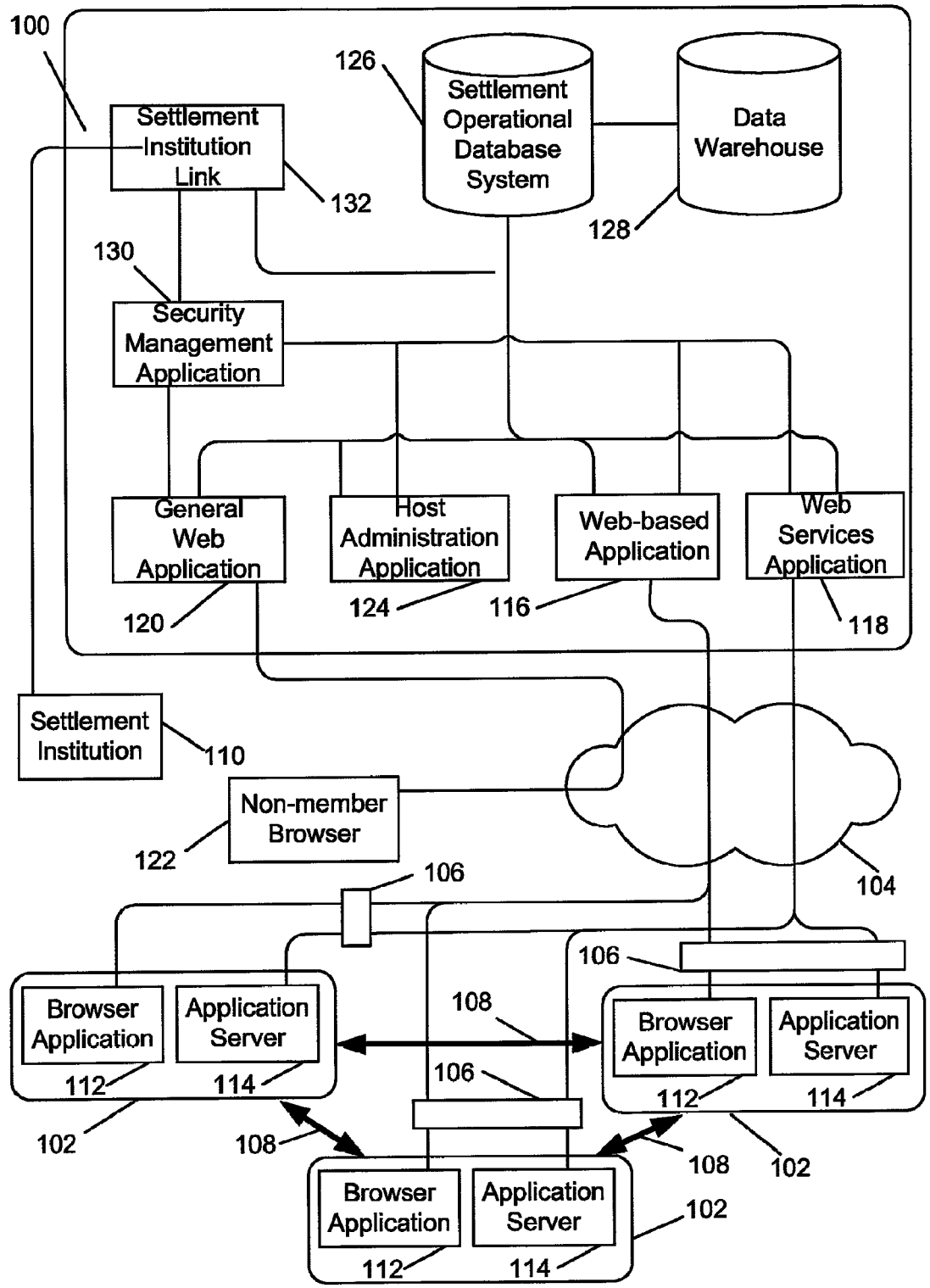
FIG. 1 is a block diagram illustrating a clearing house system in accordance with an embodiment of the present invention.

Referring now to the drawings, wherein like reference numerals designate identical or corresponding parts throughout the several views, preferred embodiments of the present invention are described.

The settlement system according the present invention enables a clearing house to exchange high volumes of items between a large number of institutions through one or more exchanges while maintaining a high level of control and reliability over the settlement process. The settlement system manages and controls which institutions may present items to which other institutions. The settlement system enables institutions to confirm the items presented to them prior to final settlement. The settlement system also enables deferred item carryover and automatic management of complex split presentation calculations.

According to a preferred embodiment of the present invention, the clearing house settlement system includes a central host that manages information received from a number of institutions participating in a clearing house exchange. The central host receives presentment information from one or more institutions participating in a clearing house exchange, processes the information, provides settlement calculations, provides various reports and information to the participating institutions regarding the exchange and provides communication between the participating institutions regarding the exchange. Participating institutions access the central host to provide and retrieve information regarding the exchange.

The central host includes a computer server to manage data calculations and storage and to manage the communication of data to participating institutions. Participating institutions access the central host through local computers with a communications link, such as through the telephone system, to the central host. The participating institutions may utilize the settlement system from multiple locations to transmit or receive information regarding an exchange.

According to one embodiment of the present invention, the central host maintains a database of member institutions that participate in the exchange. The information regarding the participating institutions that is pertinent to the exchange and settlement is stored in this database.

The central host receives information from the participating institutions regarding the items that are exchanged. This information may be received from different locations for a participating institution. The central host calculates the settlement totals which reflects all the data received regarding the respective participating institution. The central host processes the credits and debits owing from one participating institution to another, provides net settlement totals, and initiates the credits and debits to effect settlement between the participating institutions. The central host may also be configured to provide reports regarding the settlement to the participating institutions.

According to a preferred embodiment, the central host verifies the accuracy of the information provided by the participating institutions using certain calculations described below. For instance, the central host calculates the average presentment amount for the presentment over a predetermined period for a participating institution. The current presentment total for the respective institution is then compared against the average presentment amount in order to determine whether the current presentment total is within a variance of its average presentment amount. This determination enables high impact deviations from normal presentment totals to be verified and thus reduces high impact errors from the settlement calculations without significantly increasing the processing required for such verification.

In operation, a participating institution prepares information regarding the items for presentment through a particular exchange on a particular date. The presenting member institution provides the number of items and amount of the items for exchange with other institutions participating in the exchange. This information may be segregated into multiple amounts for a single receiving institution. The presenting institution communicates the presentment information to the central host prior to settlement. The information may be edited prior to communication. Certain procedures are provided to edit the information after communication but prior to settlement.

The central host receives the information from the participating institutions. Typically, the information will be transmitted from local computers at the participating institution directly to the central host. However, it is to be understood that other means may be utilized to input presentment information to the central server.

As noted above, the central host maintains calculations of the average presentment amount totals from previous settlements. Such averages are maintained on a rolling basis for a set time period, such as the prior eight weeks. The central host calculates the variance between the average presentment amount and the current presentment amount. Based on a maximum allowed variance, the central host calculates a maximum and/or minimum presentment anticipated for each institution based on an allowable maximum variance percentage maintained for the respective institution. If the current presentment total exceeds than the maximum and/or minimum presentment anticipated, then the presentment amount is subjected to an additional verification which may include communication with the presenting institution.

The central host performs presettlement calculations. The presettlement calculations include a final verification of the present variances and the receipt variances for participating institutions. After presettlement calculations, the central host performs the settlement calculations to determine the net credits and debits between the participating institutions.

After the settlement is performed, various reports regarding the settlement may be made available to the participating institutions. These reports include, without limitation, detailed information regarding the incoming totals and outgoing totals, the net settlement, the average balances used for variance calculations, volumes, and the like.

One possible non-limiting advantage of the present invention is the ability to provide computer controlled functions, calculations and communication. Such computer controlled functions, calculations and communication may be automated or semi-automated. According to one embodiment of the present invention, the items exchanged are organized by cash letters that are exchanged through the clearing house. By providing presentment information that indicates the cash letter amount, item counts and cash letter type, the central host is able to calculate totals based on the presentment information. The cash letters presented for exchange may be identified as one of many types. These different types may be used to process and track different types of cash letters for purposes such as billing. As another example, the cash letter type may indicate a deferred cash letter. Deferred items may thus be distinguished from other presented items. Thus, at presentment, the cash letter type and the number of days the cash letter is deferred may be displayed with cash letter amounts and the item volume. The system tracks the deferred value of cash letters received by the system for presentment and exchange. Deferred items from a prior date may be designated throughout the host processing and reporting.

The present invention permits data regarding the member institutions to be automatically used during the settlement process. For example, the data may include the holiday schedule for the respective institution. A participating institution may thus receive information regarding a holiday at another institution at any time, including, without limitation, during the entry of exchange information by the respective institution. Items to be exchange with institution that is on holiday can be automatically deferred to the first exchange day that they will both be in operation.

The present invention also allows for split items. According to one embodiment of the present invention, the present invention auto-calculates split items based on information maintained regarding a particular institution. Actual payout percentages and payout dates may then be calculated and tracked. Split amounts which are not considered relevant for the current date may be excluded from the settlement totals for the day. The volume count is settled on the current day. The present invention also allows for a "variable" split whereby the receiving institution dictates how much they will settle on each day upon receiving the item.

Presenting member institution may also designate an item to a hold status. Items with a hold status are automatically carried over to the same exchange to a future date, such as the next valid business day. The carry over will continue until the hold is removed or the item is deleted from the system.

According to one embodiment of the present invention, the present invention enables the confirmation of presented items prior to settlement. To enable confirmation the central host may be configured to perform a confirmation settlement operation. This operation prepares the presentment information for the receiving institutions. After the confirmation settlement operation, the receiving institutions may obtain confirmation information. Using this information, the institution may then review and confirm the individual items presented to them. For items that are not confirmed, the present invention may also be configured to require a reason why those items were not confirmed. The reason may be selected from a list provided by the system. The reason may also be supplemented by an explanation input in certain situations.

In one embodiment of the present invention, one or more institutions are indirectly corrected to each other through the central host. This connectivity is used as a communications conduit between institutions. A local computer at an institution may connect to the central host to transmit present information or to retrieve confirmation information and reporting information. This connection may also be used to transmit and receive communications, typically in the form of e-mail, from the central host. Messages may also be sent to other institutions through the central server and retrieved from other institutions through the central server. This messaging system includes functions to enhance the settlement process. Such functions include capabilities to address messages to particular departments or offices at an institution. Information may also be automatically communicated in certain circumstances. For example, the confirmation, or non-confirmation, of items may result in the generation of a message to inform the presenter of the confirmation action. The message may be automatically generated using standard message text or, if further explanation is required, the confirmation process may allow a user to enter additional information.

In a clearing house system, various member institutions exchange checks that are to paid through other member institutions. Institutions include, without limitation, financial institutions. In more simple clearing houses, member institutions, such as banks, exchange checks drawn on other member institutions. In more extensive regional and national clearinghouses, member institutions may also exchange checks drawn on other member institutions of their local clearing houses. In such a clearing house system, a central host may be maintained to facilitate the exchange of information with the participating institutions and conduct settlement processes for each exchange.

Referring to FIG. 1, a block diagram illustrating a clearing house system in accordance with an embodiment of the present invention, is shown. The clearing house system includes a central host 100 in communication with one or more member institutions 102. The central host 100 provides settlement services in a networked environment, such as, without limitation, the Internet, Intranet or the like. The member institutions 102 access the central host through the network 104. Member institutions 102 may exchange checks directly through procedures established in check exchange programs 108. Through a secure Internet connection 106, each member institution 102 accesses the central host 100 to provide presentment totals they have exchanged. The central host 100 computes each member institution's daily net position, provides this information to the member institutions 102 over the network 104, and provides net settlement figures to a settlement institution 110, which debits and credits member institutions accounts accordingly.

Each member institution 102 uses a browser application 112 or the like as a user interface to communicate with the central host 100. The browser application 112 provides users with a graphical interface that is familiar to computer users and is flexibly implemented on computer utilizing various platforms at member institutions 102. Users at each member institution receive settlement information and may input presentment data via browser application 112. Member institutions 102 may also employ an application server 114 for automating the input of presentment data to the central host 100.

Components of central host 100 for receiving and processing presentment data from member institutions 102 are also shown in FIG. 1. A web-based application 116 securely sends and receives information when accessed by browser application 112. The web-based application 116 may be configured to control an Internet server for communicating with browser applications 112 over the network 104. A web services application 118 may be configured to communicate with one or more application servers 114 to receive automated presentment data. The central host 100 also include a general web application 120 that provides information through the network 104 to one or more non-member institution browsers 122. A host administration application 124 enables the clearing house operators to control and interface with the central host 100. A settlement operational database system 126 maintains the data provided through web-based application 116 and web services application 118 and internally calculated data used during the daily settlement processes. A data warehouse 128 receives data from operational database 126 on settled transactions for historical analysis and reporting. A security management application 130 provides centralized user and security management. A settlement institution link 132 provides the net settlement figures to settlement institution 110.

The central host 100 may be configured to provide multilateral settlement calculations for member institutions 102 participating in various exchanges conducted at various times throughout the week and throughout the day, information to the member institutions 102 regarding the exchanges in which they participate, and communication between member institutions 102. In a typical national exchange, member institutions 102, such as large banks, exchange physical copies of the checks through check exchange programs 108, such as by air courier, that they have received directly or through participation in local clearing houses. Participating member institutions 102 may be configured to provide presentment data to the central host 100 manually through browser application 112 or automatically through an interface between application server 114 and the member institution's internal data management system. Participating member institution 102 may also be configured as access the presentment information regarding itself that other participating member institutions have provided to central host 100 and to input information to confirm that the presented checks have been received. Such information may be maintained in settlement operational database system 126 or the like. The web-based structure of the clearing house system allows member institutions to access this information as required through browser application 112. Forms of information assembled by host administration application 124 are requested by browser application 112 and provided through web-based application 116 based on the real-time data maintained in settlement operational database system 126. At the scheduled settlement time, final settlement figures are established, transmitted to a settlement institution 110, such as the Federal Reserve through the Enhanced Net Settlement Service. Final settlement figures may also be and are communicated to the participating member institutions through web-based application 116. As the central host 100 receives the exchange data in a continuous and flexible manner separate settlement calculations can be computed for individual institutions. After a period of time has passed the data regarding the exchange is transferred to the data warehouse 128. The web-based clearing house system provides for rapid exchange of real-time data between the central host 100 and member institutions 102 in a form that is familiar to users of browser applications.

The present invention also enables communication of time sensitive information regarding an active exchange to participating member institutions 102. Upon login to the central host 100, the member institution 102 may access information though browser application 112. A broadcast messaging system may be configured to communicate messages to all participating member institutions 102. The clearing house operator through host administration application 124 can create each message with a target, subject, message, start date and end date. The target indicates the institutions that will receive the message. The target may be without limiting general, such that all member institutions 102 will receive the message, or may be limited to a particular exchange, such that only member institutions 102 participating in the particular exchange will receive the message. The subject provides general information to organize messages. The message includes the information to be communicated. The start date and end date designate the time during which the message be communicated. In one embodiment, the receiving institution may access the message via a web page. Accordingly, timely information regarding the clearing house and each exchange is distributed in a timely manner through the clearing house system.

The present invention also enables communication of real-time information to institutions on demand. Each member institution 102 may retrieve information through browser application 112 and web-based application 116 about exchanges in which they are participating. Specific information is available regarding the transactions in which the institution is involved. In particular, each member institution may retrieve current information from the settlement operational database system 126 regarding the status of transactions that they have presented and those requiring their confirmation as well as their net position at any given time. Further, the positions of each participating member institution may be requested and calculated on demand. To retrieve information, a member institution issues a request through browser application 112. The request is processed by web-based application 116, which retrieves information from the settlement operational database system 126. The web-based application may employ a generator to construct the report. The report is then communicated to the requesting browser application 112 for viewing. The report may be formatted as requested by the requesting user. Accordingly, each member institution has access to full pre-settlement and settlement information as required. The clearing house operator obtains exchange information in a similar manner through host administration application 124.

The present invention also enables communication of time sensitive information between exchange institutions. Communication between member institutions is generally provided at the presentment transaction level. Accordingly, institutions may access information and provide input related to each presentment and associated confirmation. According to one embodiment of the present invention, the information is provided via a comment log. These comments are inputted and accessed through forms processed by browser application 112 and web-based application 116. Thereby, critical information regarding the exchange of checks or other items between institutions may be timely communicated between member institutions using the present invention.

The present invention may also communicate information to non-member institutions over the network 104. Information, such as availability schedule indicating the institutions in particular exchanges, is provided as web pages through general web application 120 to anyone over the network 104. The information provided may include, without limitation, information from the settlement system and thus may be dynamically generated.

The central host 100 electronically communicates final settlement figures to the settlement institution 110 in a manner and format acceptable to the settlement institution 110. This communication may occur through the Internet or through other communications means. The settlement institution may also obtain information as through a browser application 112 in a manner similar to any member institution 102.

According to one embodiment of the present invention, the security management application 130 ensures secure communication between the central host 100 and member institutions 102 by maintaining a directory of member institution information and authorizing access to information at the central host 100.

The central host 100 may include duplicate components, which may be located at remote physical sites for reliability. Accordingly, data may be mirrored to redundant components at regular intervals. These duplicate components may be called on to perform the functions described herein should the primary components fail. The Internet permits communication to be routed to alternate servers in the case of primary server failure.

In a similar manner a member institution 102 may communicate with the central host 100 through any properly authenticated browser application 112 or application server 114. Users at a particular member institution 102 access the central host 100 through various browser applications 112. Each user is authenticated by security management application 130. Different users from a single member institution may be provided with different levels of access depending on the user's role or job responsibility. Particular users may be authorized to enter presentments while other users may only authorized to enter confirmations. Different users at a single member institution 102 may be provided access to different reports or types of reports.

The networked nature of the present invention system permits the host system 100 to closely monitor the exchange process. Tracking information from couriers employed in the check exchange program 108 may be sent, retained and disseminated through central host 100. The check exchange program 108 may also utilize an electronic check presentment system, which may provide information to the central host 100. The present invention also enables the central host 100 to be used to communicate electronic check presentment information thus reducing or eliminating the requirement for a separate check exchange program 108. The settlement operational database system 126 may maintain information on individual checks or transactions. This information may include image information of checks where appropriate.

According to one embodiment of the present invention, a user at a member institution 102 uses a browser application 112 to access the clearing house system web site. The user is authenticated by the security management system 130 and accesses the home page of the settlement system where broadcast messages and announcements are displayed. Depending on the authorization of the user, access to a number of functions is available. The user may select an exchange in which the institution is participating and input the presentment data to the central host 100. Presentment web pages are accessed to view and edit the presentment figures regarding the items presented to the other member institutions participating in the exchange. The initial presentment data may be input by the user through this web page. Alternatively, the initial presentment data may be input by application server 114 and then viewed and edited through this web page. The user may view the cash letters presented that have been confirmed, not confirmed, or have not been acted on along with and holds that have been indicated. Similar information is viewed regarding adjustments and returns. Further information regarding the exchange and transactions may also be available to the user. The system may also be configured to indicate whether the institution's presentments are within risk tolerances. Other information such as electronic check presentment data or images may also be viewed through this web page if available. A confirmation web page is similarly accessed and permits the user to confirm which cash letters that have been presented to the institution have been received and accepted. For each transaction between institutions comments regarding the transactions may be entered and viewed using these web pages. Users at each member institution are able to conduct all required functions regarding participation in the clearing house using the present invention. Users at each member institution are able to conduct all functions regarding a particular exchange at any time during at set period of time prior to the settlement of the exchange. Confirmations can be entered as completed. Reports can be retrieved by the institutions on demand. Functions such as splitting presentment totals over multiple days and deferring presentments are available to the institutions in each exchange. Users may access web pages to edit the types of cash letter that the institution accepts and the attributes of these offerings, such as the associated fees and the days of the week and the dates that the particular cash letters will be accepted. As the user inputs or edits information through browser application 112, it is communicated securely through web-based application 116 to update the settlement operational database system 126. This information is then made available as appropriate to the clearing house operator through host administration application 124, other member institutions through browser applications 112, and other through non-member institution browsers 122.

Clearing house operators monitor and control the exchange process through the host administration application 124. Various functions controlled through the host administration application 124 include the ability to view web pages including the status of the each exchange by viewing for each institution the number of transactions presented, the value of the transactions, the number of items presented, the value of transactions received, the number of items received, the number of transactions confirmed by the institution, the number non-confirmed by the institution, and the transaction in which action has not been taken. These web pages indicate whether the totals of the institutions are within the risk tolerance set for the exchange or for a particular institution. Further detailed information regarding each transaction may also be viewed. Such details may include the transaction date, the type of cash letter, the amount of the cash letter, the cash letter item count, whether the transaction is confirmed or non-confirmed, when the transaction is to be paid if a deferred or split transaction, and whether the transaction is in hold status. The operators may view risk control web pages that include information for institutions regarding the average presentment amount for the day, the allowable percentage high and low variance, maximum and minimum presentment amount based on the allowable variance, and the current presentment amount. These web pages provide similar data regarding the receipts of the institutions. The operator may access web pages to create a broadcast message and/or other message for each exchange. The operators may also access web pages similar to those available to the member institution users. The operators may perform data entry for member institution when required using these web pages. The operators also access web pages to control the administrative aspects of the clearing house. These web pages allow holidays to scheduled. They allow the parameters for each exchange to be established and edited.

Figure 2B:

Referring to FIGS. 2A-2J, an exemplary user interface and computer program for processing presentment and settlement information to institutions participating in a regional or national clearing house is shown. The host settlement user interface 200, as shown in FIG. 2A, may be used by a user to monitor institutions in real time, or at least substantially in real time, as the institutions submit cash letters to other institutions. The host settlement user interface 200 reflects, inter alia, the number of cash letters that have been submitted and the total dollar amount 202 of these cash letters. The host settlement user interface 200 may optionally include a visual indication 204 indicating whether an institution has exceeded or fallen below a predetermined percentage of the institution's average presented amount over a predetermined period. According to one embodiment of the present invention, the predetermined period is an eight week period.

The broadcast messaging user interface 250, as shown in FIG. 2B, may be used by a user to send messages to institutions to alert those institutions of certain items. A user may send messages to a selected exchange or to all exchanges.

Figure 2C:
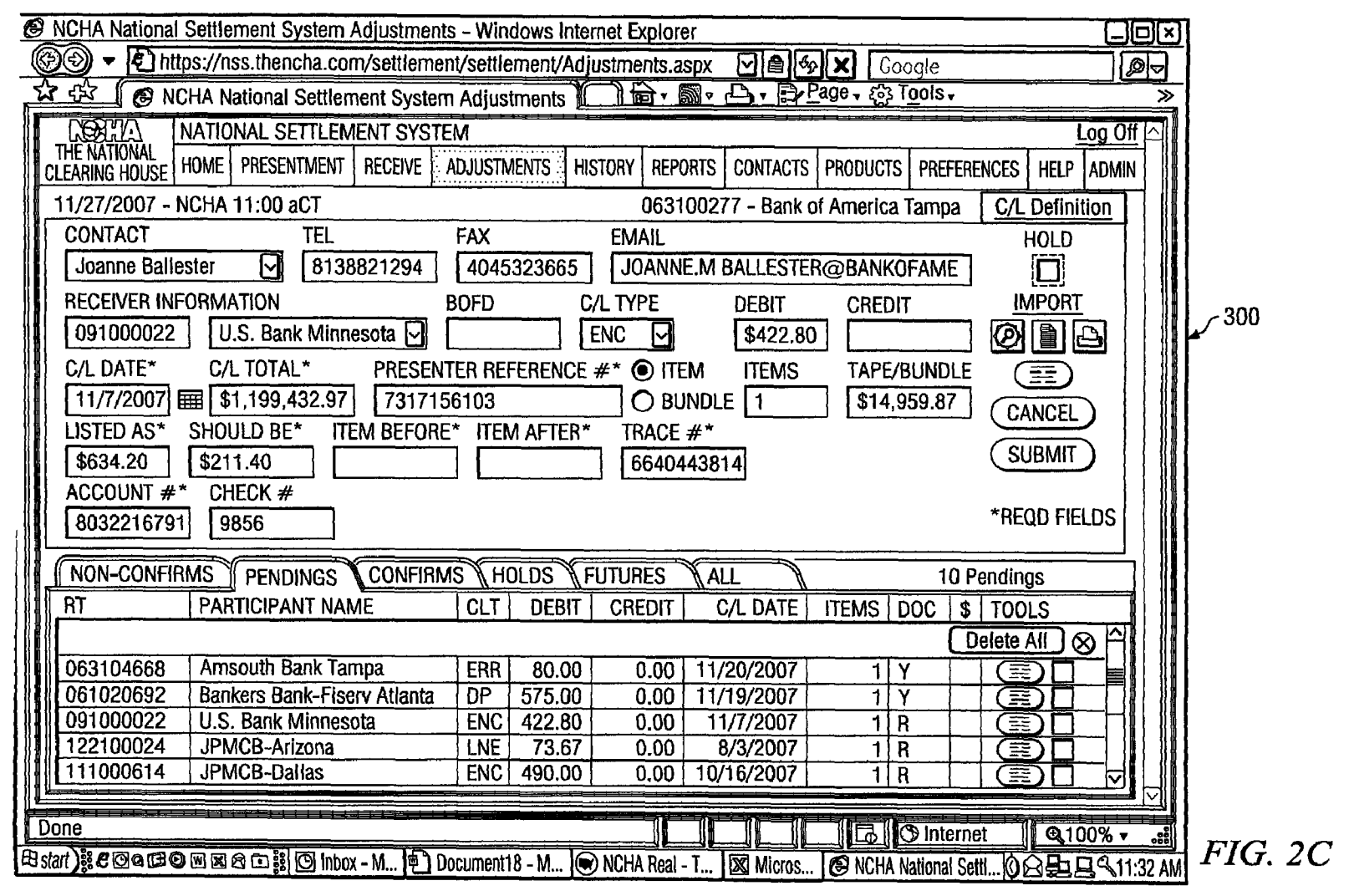

The online adjustment user interface 300, as shown in FIG. 2C, may be used by a user to enter detailed information about an adjustment for a previously received item within a cash letter. The adjustment information is then presented to an institution. That institution may then immediately, or at least in near real time, view the adjustment information for purposes of an adjustment.

Figure 2D:
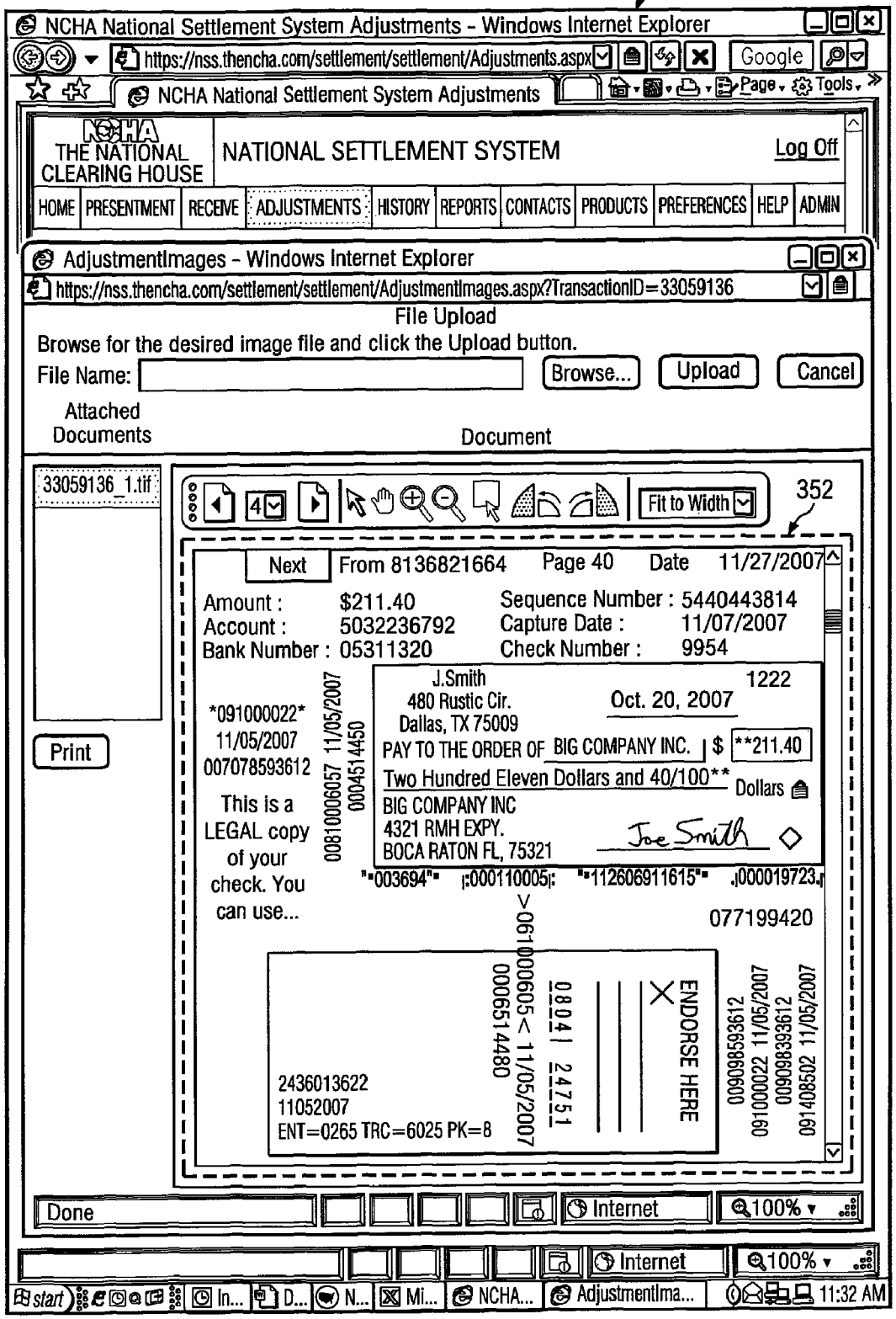

The supporting documentation user interface 350, as shown in FIG. 2D, may be used by a user to upload supporting documentation for each adjustment. The supporting documentation may be in any format, including, without limitation, digital images, scanned images, PDFs, JPGS, bitmaps, TIFFs, MS Word, ASCII, MS Excel, database files, binary and the like. The supporting documentation may include, without limitation, scanned images of a check, money order, draft, or deposit. For example, output area 352 shows the front and back sides of a check as a scanned image. The supporting documentation is then presented to an institution along with the adjustment information described above with respect to FIG. 2C. The receiving institution may then immediately, or at least in near real time, view the supporting documentation for purposes of an adjustment. This significantly expedites the adjustment process and allows determinations to be made by the receiving institution without requiring physical copies of such supporting documentation. For instance, the receiving institution can make an adjustment determination without waiting for the actual check to arrive which may take several days. The adjustment process is thus significantly expedited. Optionally, the user may also choose to fax supporting documentation into a central fax server located at PaymentsNation where the faxed documents will then be converted into images and automatically attached to the transaction by reading a bar code located on a fax cover sheet. By reading the barcode, the present invention will know what transaction to attach the items to.

Figure 2E:
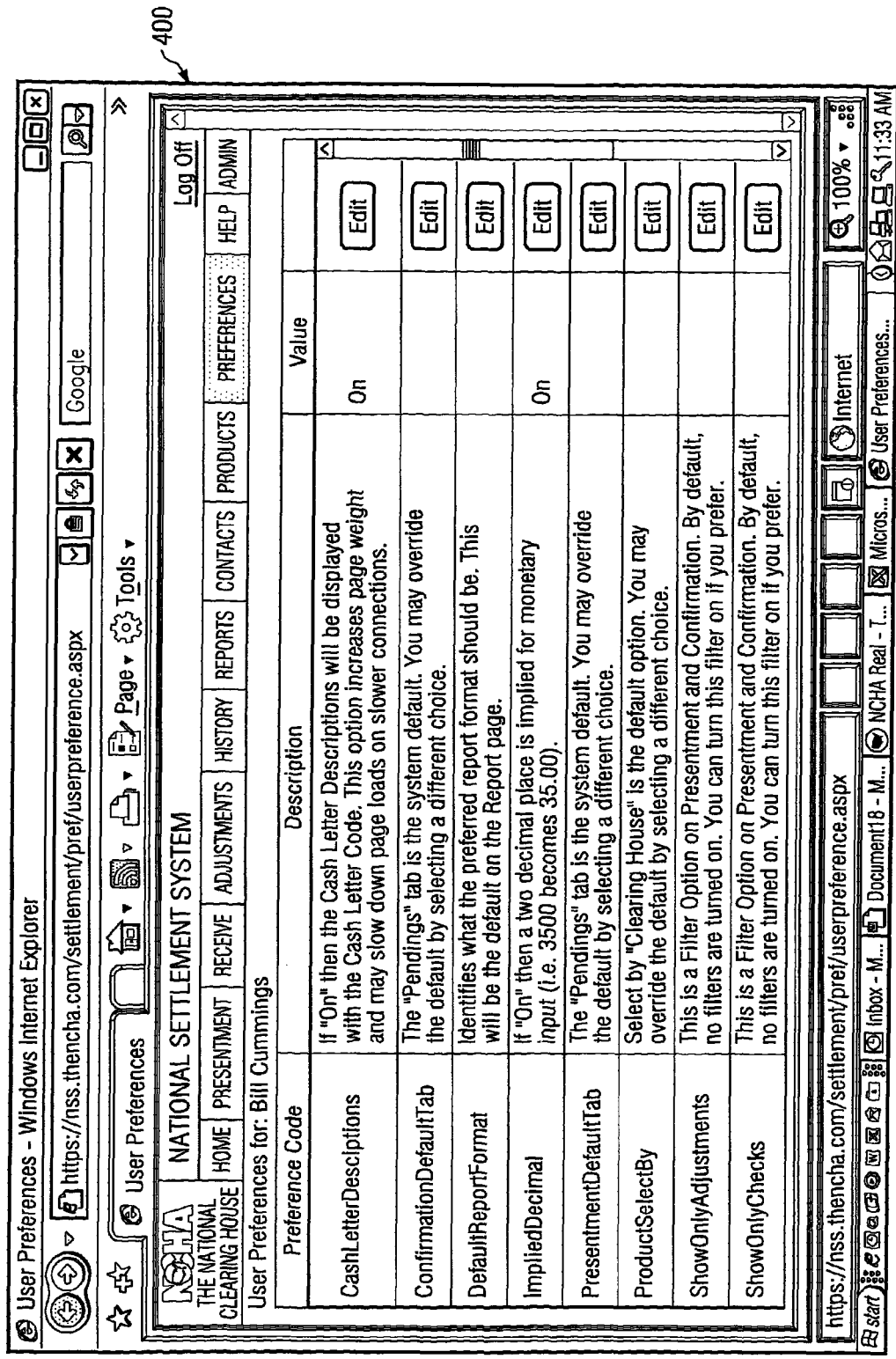

The present invention is also customizable. The user preference setup user interface 400, as shown in FIG. 2E, may be used by a user to set the user's personal settings when using the system.

Figure 2F:
Figure 2G:

The settlement flow user interface 450, as shown in FIGS. 2F-2I, may be used by a user to monitor institutions during the settlement process via an output area 452. As shown in FIG. 2F, a user may use the settlement flow user interface 450, inter alia, to monitor institutions submitting cash letter information and to determine whether the institution has submitted cash letter information. In one embodiment of the present invention, the settlement flow user interface 450 includes an exchange selection field 454, a date field 456 and a status indicator 458. The exchange selection field 454 may be used by a user to change the exchange in which settlement processing is to be monitored and/or processed. The date field 456 may be used by a user to change the period to be monitored and/or processed. The status indicator 458 may be used by a user to change the current status between "Open," "Closed" or "Settled." It is to be understood that the status indicators used are for exemplary purposes and that other status indications are possible within the scope of the present invention. As shown in FIG. 2G, a user may use the status indicator 458 to update the status of the exchange to "Closed." Typically, the status of the exchange is changed to a "Closed" status after the presentment deadline has occurred. However, it is to be understood that changing the status of the exchange is not limited to such and that other possible triggers are possible within the scope of the present invention. After the status of the exchanged has been closed, a user will not be permitted to submit any additional cash letter data for that day.

Figure 2H:
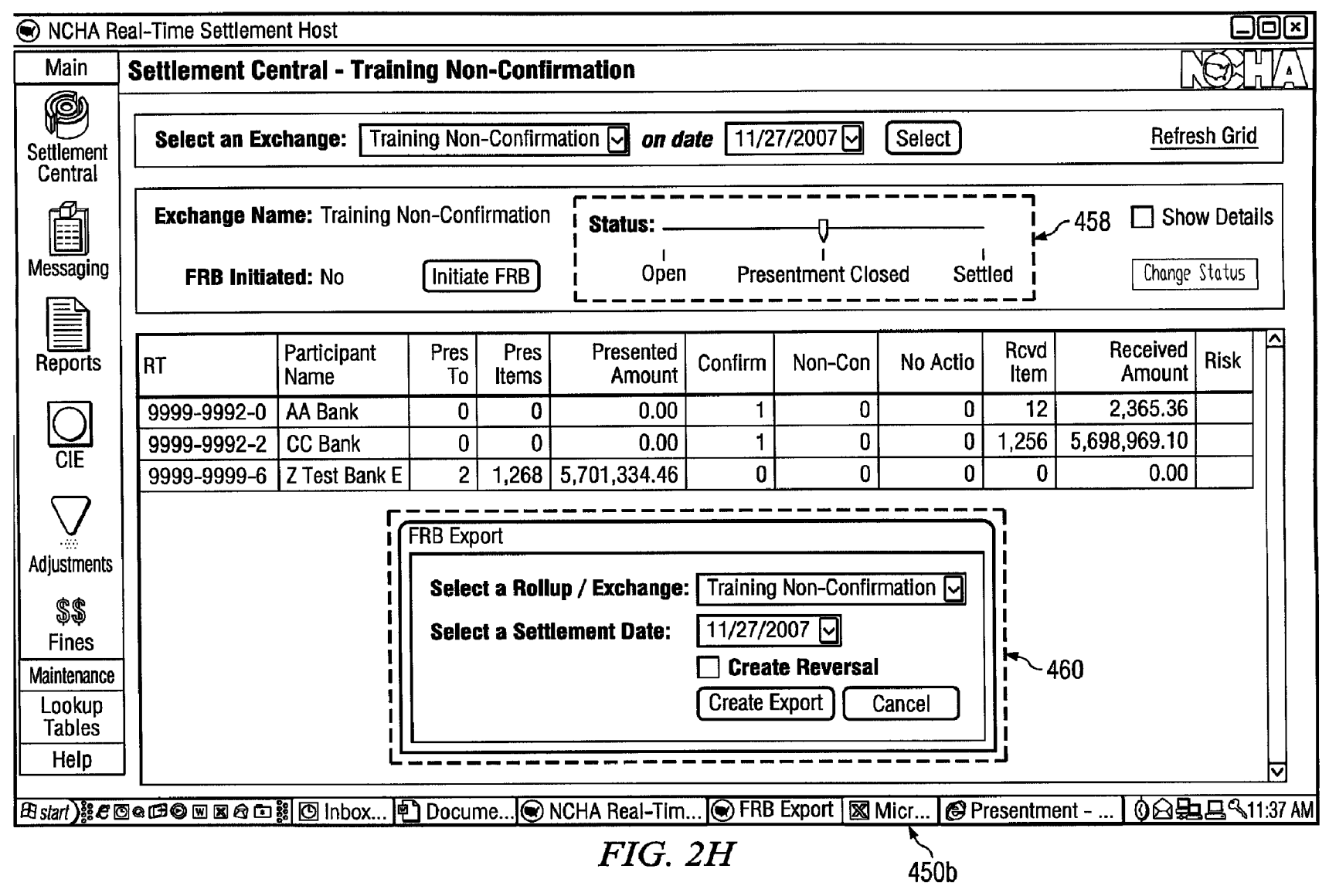

As shown in FIG. 2H, after presentment has been closed, a user may use the settlement flow user interface 450, inter alia, to and create a Federal reserve file which reflects a net total for the institution that will post to their Federal reserve account. In one embodiment of the present invention, a federal reserve board export user interface 460 is used to create a Federal reserve file. After creation, the Federal reserve file is submitted to the Federal Reserve for processing.

Figure 2I:
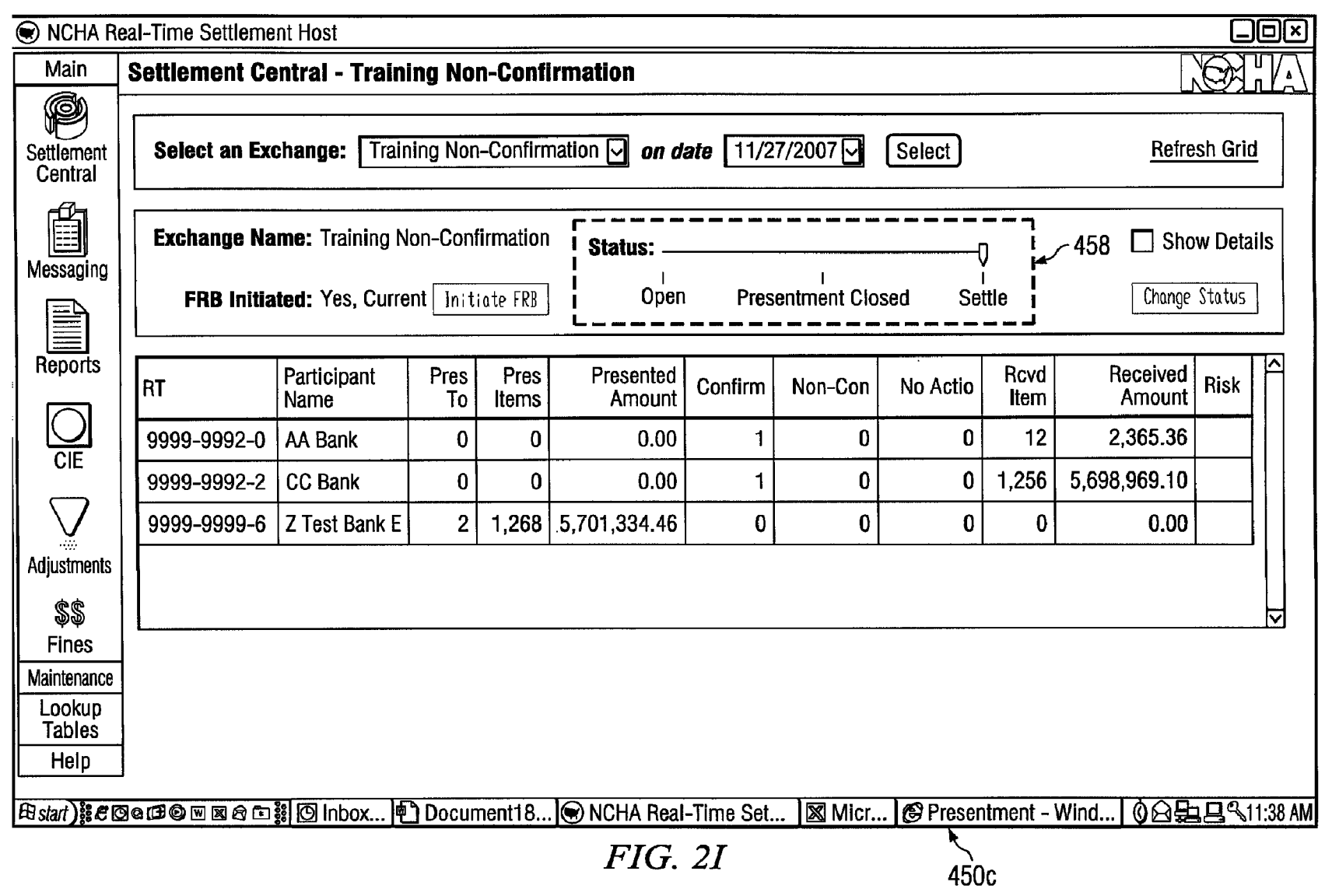

As shown in FIG. 2I, once the Federal reserve file has been submitted and processed, a user may use the status indicator 458 to update the status of the exchange to a "Settle" status.

The file view interface 500, as shown in FIG. 2J, may be used by a user to view files, via output area 502, that are submitted by vendors who are responsible for processing one or more institutions. According to one embodiment of the present invention, an automated file feed from the vendor is used. Once the file has been processed, a user may then view transactions in each file submitted in transmission detail area 504. Each file may be assigned a "transmission ID" by the system which with the file for the life of the file.

Figure 3A:
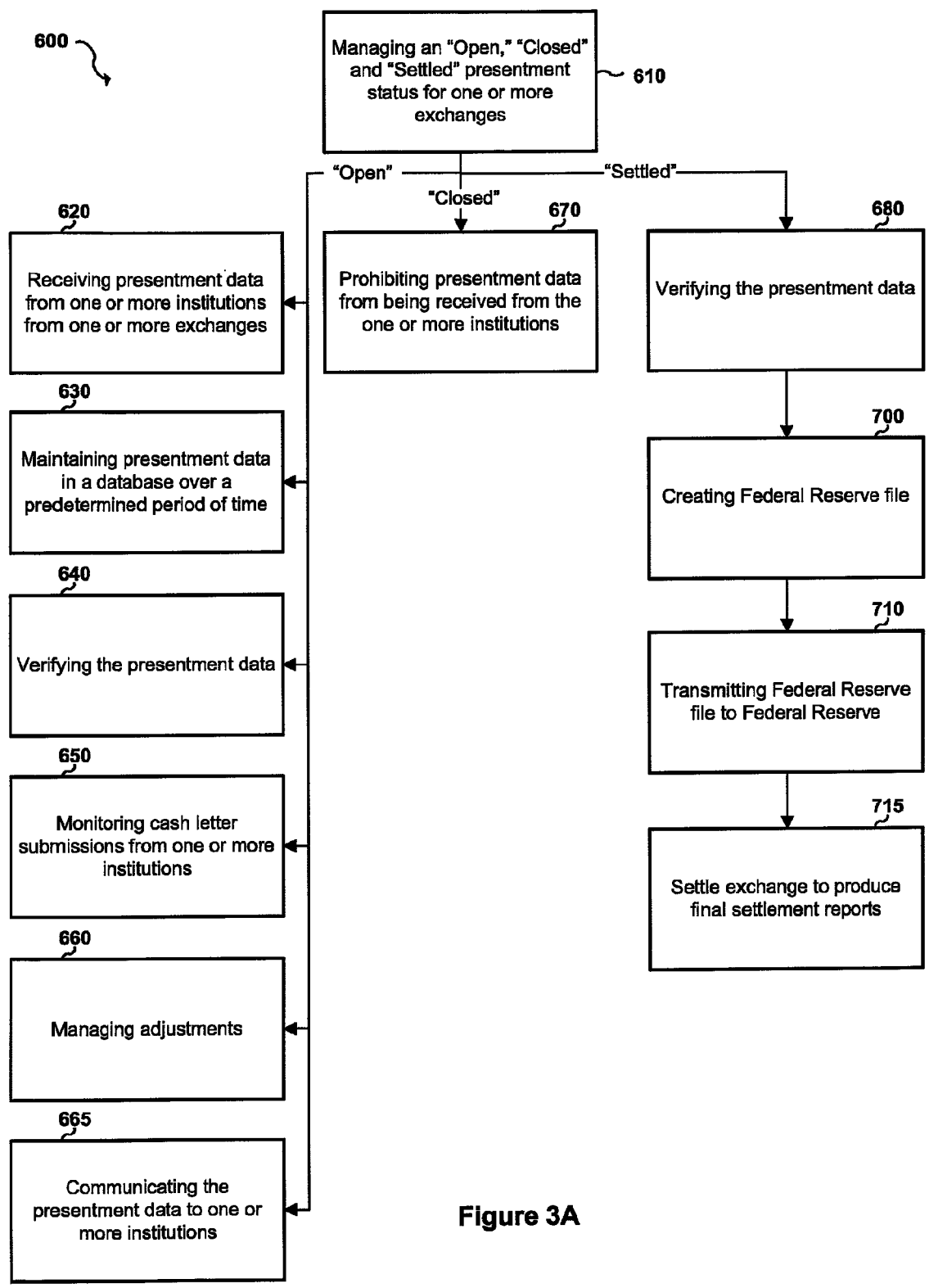
FIGS. 3A-3C are flow charts illustrating a method for processing presentment and settlement information to institutions participating in a regional or national clearing house in accordance with an embodiment of the present invention.

Referring to FIG. 3A, a flow chart illustrating a method for processing presentment and settlement information to institutions participating in a regional or national clearing house in accordance with an embodiment of the present invention is shown. The presentment status for one or more exchanges is managed between "Open," "Closed," or "Settled," as shown at block 610. As shown at block 620, the system receives presentment data from one or more financial instructions from one or more exchanges. The presentment data is maintained in a database over a predetermined period of time, as shown at block 630. The presentment data may be periodically verified, as shown at block 640. As shown at block 650, cash letter submissions from one or more institutions are monitored. Adjustments to the presentment data are managed, as shown at block 660. Optionally, at least a portion of the presentment data is communicated to one or more institutions, as shown at block 665.

Once the presentment status is "Closed," presentment data is no longer received, as shown at block 670.

Figure 3B:
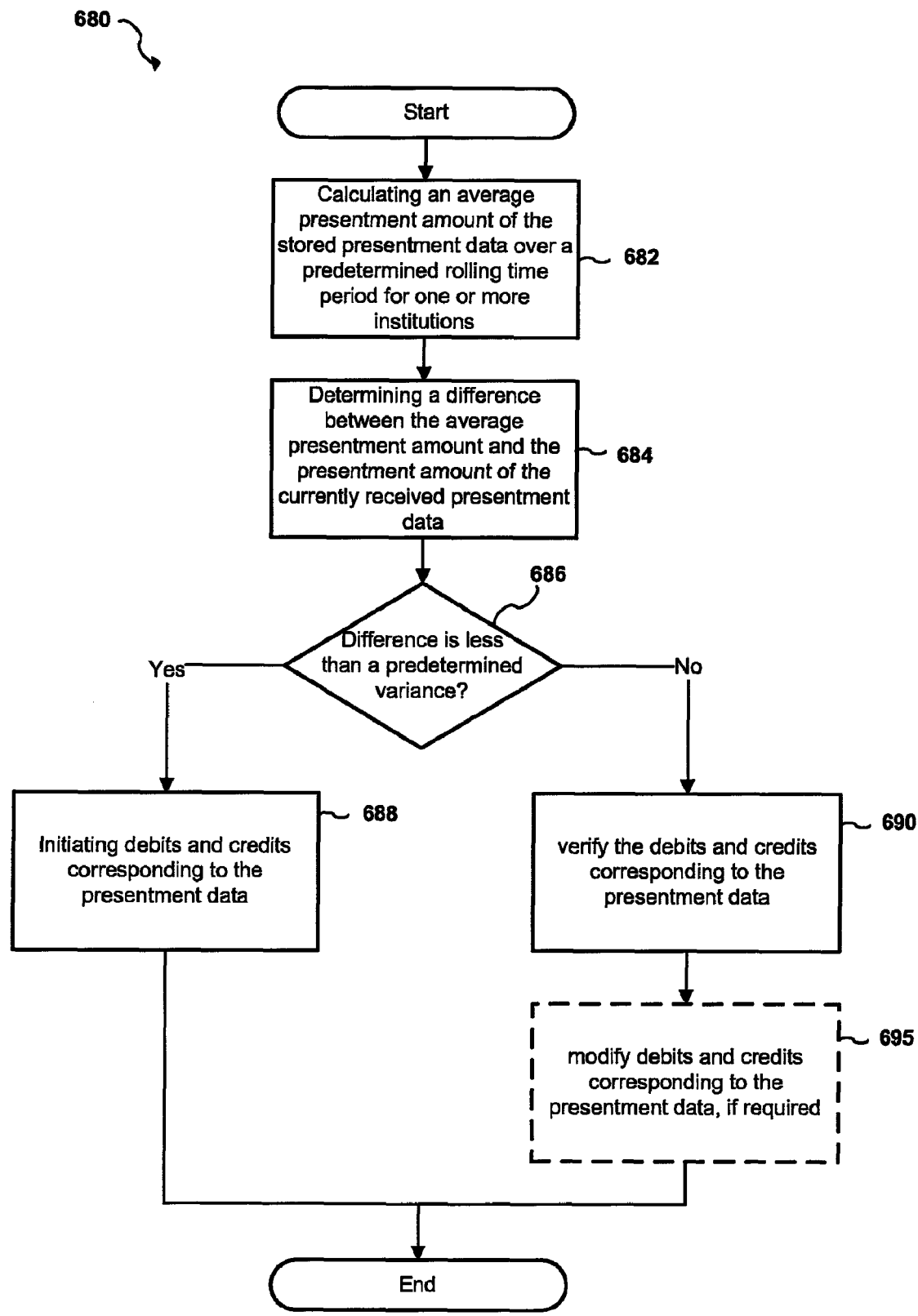

As shown at block 680, the presentment data may be verified for accuracy, as further detailed in FIG. 3B. After the presentment data is verified, a Federal Reserve file is created and transmitted to the Federal Reserve, as shown at blocks 700 and 710, respectively. The exchange is then settled to produce final settlement reports, as shown in block 715.

Referring to FIG. 3B, a flow chart illustrating an exemplary verification of presentment data is shown. As shown at block 682, an average presentment amount over a predetermined rolling time period is calculated for an institution. A difference between the average presentment amount over a predetermined period and the presentment amount of the currently received presentment data for the same institution is determined, as shown at block 684. A determination of whether the difference is above or less than a predetermined variance occurs at logic block 686. If the difference is within the predetermined variance, then the debits and credits corresponding to the presentment data are initiated, as shown at block 688. Otherwise, if the difference is greater than the predetermined variance, then additional verification of the debits and credits corresponding to the present data occurs, as shown at block 690. The verification process above may be used to flag/identify errors associated with the presentment data while it is being processed and/or prior to settlement. Thereby, the verification of the presentment data employed by the present invention reduces the number of errors associated with the presentment data while minimizing the processing required for such verification. It is to be understood that verification of the presentment data may utilize other techniques within the scope of the present invention. If required, the debits and credits corresponding to the presentment data may be modified, as shown at block 695.

Figure 3C:
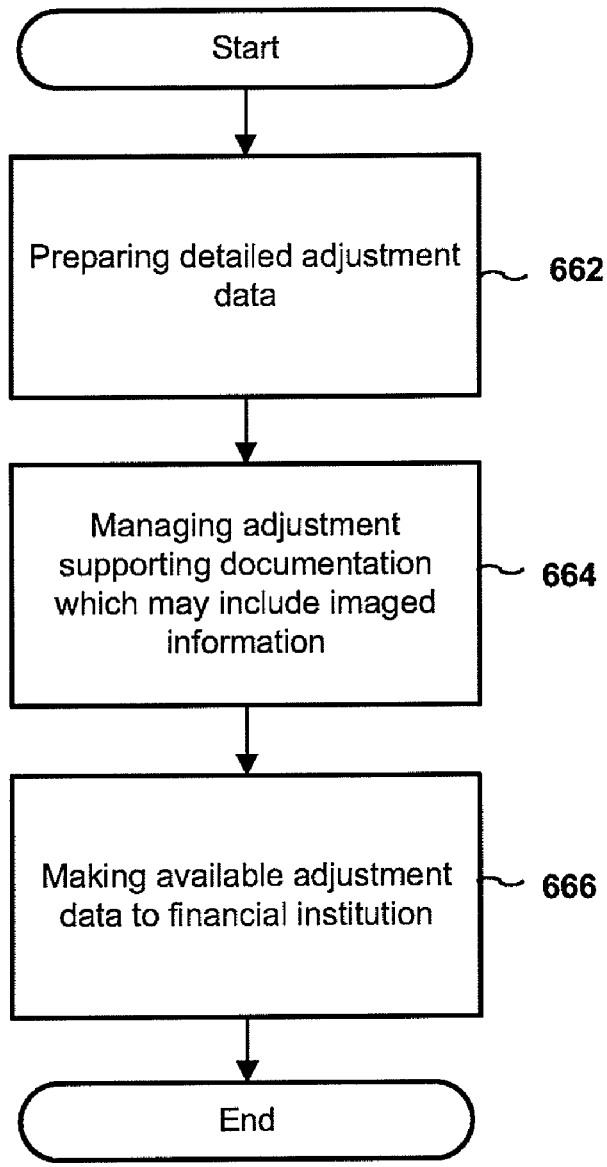

Referring to FIG. 3C, a flow chart illustrating an exemplary adjustment of the presentment data is shown. As shown block 662, adjustment data may be entered and/or recorded by a user. Adjustment supporting documentation is managed, as shown at block 664. The adjustment may optionally include supporting documentation, which may include, without limitation, scanned images. Upon completion, the adjustment data is made available to the relevant institution, as shown at block 666. This may be accomplished by any known means including, without limitation, allowing the adjustment data to be accesses via a Web or FTP site, and electronic transmission of the adjustment data.

The present invention thus includes a computer program which may be hosted on a storage medium and includes instructions which perform the processes set forth in the present specification. The storage medium can include, but is not limited to, any type of disk including floppy disks, optical disks, CD-ROMs, magneto-optical disks, ROMs, RAMs, EPROMs, EEPROMs, flash memory, magnetic or optical cards, or any type of media suitable for storing electronic instructions.

Obviously, many other modifications and variations of the present invention are possible in light of the above teachings. The specific embodiments discussed herein are merely illustrative, and are not meant to limit the scope of the present invention in any manner. It is therefore to be understood that within the scope of the disclosed concept, the invention may be practiced otherwise then as specifically described.

The invention claimed is:

1. A clearing house system for exchanging debits and credits between participating institutions, the system comprising:
   a plurality of remote computers of participating institutions;
   a central server;
   a network interface in communication with the clearing house computer and the plurality of remote computers over a network, the network interface being configured to receive a plurality of presentment data from one or more of the plurality of remote computers, each of the plurality of presentment data including one or more debit or credit items each having a presentment amount;
   a database in communication with the central server;
   wherein the central server is configured to:
      store in the database the plurality of presentment data previously received over a predetermined rolling time period;

provide means for determining whether a difference between an average presentment amount of the stored presentment data for one or more of the participating institutions from which presentment data is received and the presentment amount of the currently received presentment data is within a predetermined variance;

initiate the debits and credits corresponding to the presentment data if the difference is within a predetermined variance;

verify the debits and credits corresponding to the presentment data if the difference is more than the predetermined variance; and communicate at least a portion of the stored presentment data via the network interface to one or more of the plurality of remote computers on demand.

2. The clearing house system of claim 1, wherein the presentment data includes information designating the types of items presented for exchange and wherein the central server stores the types of items each participating institution accepts.

3. The clearing house system of claim 1, wherein the central server enables communication between the participating institutions regarding the exchange.

4. The clearing house system of claim 1, wherein the central server includes an Internet server.

5. The clearing house system of claim 4, wherein the Internet server communicates data between the central server and web browsers on the remote computers.

6. The clearing house system of claim 1, wherein the participating institutions exchange items by means of the network interface.

7. The clearing house system of claim 6, wherein the central server is further configured to store information relating to the items electronically exchanged.

8. The clearing house system of claim 1, wherein the presentment data communicated to one or more of the plurality of computers on demand includes net presettlement positions.

9. The clearing house system of claim 1, wherein the network interface is further configured to receive a plurality of confirmation data from one or more of the plurality of remote computers, wherein the confirmation data includes information regarding whether the items in the presentment data is accepted.

10. The clearing house system of claim 1, wherein initiating the debits and credits comprises providing information relating to at least a portion of the presentment data to a settlement institution which debits and credits the participating institutions accounts.

11. A computer program product embodied on a computer readable medium for exchanging debits and credits between participating institutions of a clearing house system that includes a plurality of remote computers of participating institutions, a central server, a network interface in communication with the clearing house computer and the plurality of remote computers over a network, the network interface being configured to receive a plurality of presentment data from one or more of the plurality of remote computers, each of the plurality of presentment data including one or more debit or credit items each having a presentment amount, and a database in communication with the central server, the computer program product comprising:

a first computer code for storing in the database the plurality of presentment data previously received over a predetermined rolling time period;

a second computer code for calculating an average presentment amount of the stored presentment data for one or more of the participating institutions from which presentment data is received;

a third computer code for determining the difference between the average presentment amount and the presentment amount of the currently received presentment data;

a fourth computer code for initiating the debits and credits corresponding to the presentment data if the difference is within a predetermined variance;

a fifth computer code for verifying the debits and credits corresponding to the presentment data if the difference is more than the predetermined variance; and a sixth computer code for communicating at least a portion of the stored presentment data via the network interface to one or more of the plurality of remote computers on demand.

* * * * *